US012743778B2

(12) United States Patent
Gogna et al.

(10) Patent No.: US 12,743,778 B2
(45) Date of Patent: Sep. 22, 2026

(54) GUIDANCE FOR PATIENT IN PELVIC EXAMINATION

(71) Applicant: GE Precision Healthcare LLC, Waukesha, WI (US)

(72) Inventors: Anuprriya Gogna, Bengaluru (IN); Rahul Venkataramani, Bengaluru (IN); Naveen Paluru, Bengaluru (IN)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/781,330

(22) Filed: Jul. 23, 2024

(65) Prior Publication Data

US 2026/0030743 A1 Jan. 29, 2026

(51) Int. Cl.
*A61B 8/00* (2006.01)
*A61B 8/08* (2006.01)
*A61B 34/20* (2016.01)
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10132* (2013.01)

(58) Field of Classification Search
CPC ..................... G06T 7/0012; G06T 7/11; G06T 2207/10132; A61B 8/12; A61B 8/4227
See application file for complete search history.

(56) References Cited

U.S. PATENT DOCUMENTS 10,856,848 B2 * 12/2020 Gafner .................... G06T 11/60
11,324,999 B2 5/2022 Siegel
2006/0064007 A1 * 3/2006 Comaniciu ............... G06T 7/12 600/416
2019/0076112 A1 * 3/2019 Montgomery, Jr. ..... A61B 8/12
2020/0037997 A1 * 2/2020 Viggen ................ A61B 8/5223
2024/0050024 A1 * 2/2024 Sham .................. A61B 8/4227

OTHER PUBLICATIONS

Tanner, Holly. Valsalva and the Pelvic Floor. Herman & Wallace Rehabilitation Continuing Education—The Pelvic Rehab Report. pp. 1-2. https://hermanwallace.com/blog/valsalva-and-the-pelvic-floor.

Orno, A.K., Dietz, H.P., Levator co-activation is a significant confounder of pelvic organ descent on Valsalva maneuver. Ultrasound Obstet Gynecol 2007; 30: 346-350. Published online Aug. 14, 2007 in Wiley InterScience (www.interscience.wiley.com).

* cited by examiner

*Primary Examiner* — Baisakhi Roy
(74) *Attorney, Agent, or Firm* — McAndrews, Held & Malloy, Ltd.; Daniel Bissing; David Bates

(57) ABSTRACT

Systems and methods for automatic guidance in ultrasound scans including: an ultrasound probe configured to perform an ultrasound image acquisition; and at least one processor configured to: present the ultrasound image acquisition; receive user input representing one or more landmark points relative to one or more anatomical structures in the ultrasound image acquisition; identify the one or more anatomical structures based on the one or more landmark points; segment the one or more anatomical structures; track the one or more anatomical structures as a maneuver is performed by tracking the one or more landmark points, wherein the maneuver causes the one or more anatomical structures to move; and present the ultrasound image acquisition with feedback regarding the movement of the one or more anatomical structures.

22 Claims, 6 Drawing Sheets

GUIDANCE FOR PATIENT IN PELVIC EXAMINATION

FIELD

Certain embodiments relate to ultrasound imaging. More specifically, certain embodiments relate to providing automatic guidance during pelvic examinations with ultrasound imaging.

BACKGROUND

Ultrasound imaging is a medical imaging technique for imaging organs and soft tissues in a human body. Ultrasound imaging uses real time, non-invasive high frequency sound waves to produce two-dimensional (2D), three-dimensional (3D), and/or four-dimensional (4D) (i.e., real-time/continuous 3D images) images.

Ultrasound imaging is a powerful tool for visualization and diagnosis of anatomical structures. Ultrasound images are acquired by an ultrasound probe that may be used to scan anatomical structures to produce ultrasound images. However, current methods and ultrasound systems for obtaining ultrasound images, providing guidance to a user, and providing diagnostic evaluation of the pelvic floor include a high degree of uncertainty and inaccuracy with regards to maneuvers performed for the diagnostic evaluation. For example, to diagnose conditions such as prolapse, pelvic organ descent, avulsion, etc., a woman is requested to perform either a Valsalva maneuver (forced expiration against a closed glottis), which is an expanding maneuver or a contracting maneuver. However, performing such maneuvers is not straightforward and would benefit from additional guidance while the maneuvers are being performed.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for automatic guidance during pelvic examinations with ultrasound imaging, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION

Figure 1:
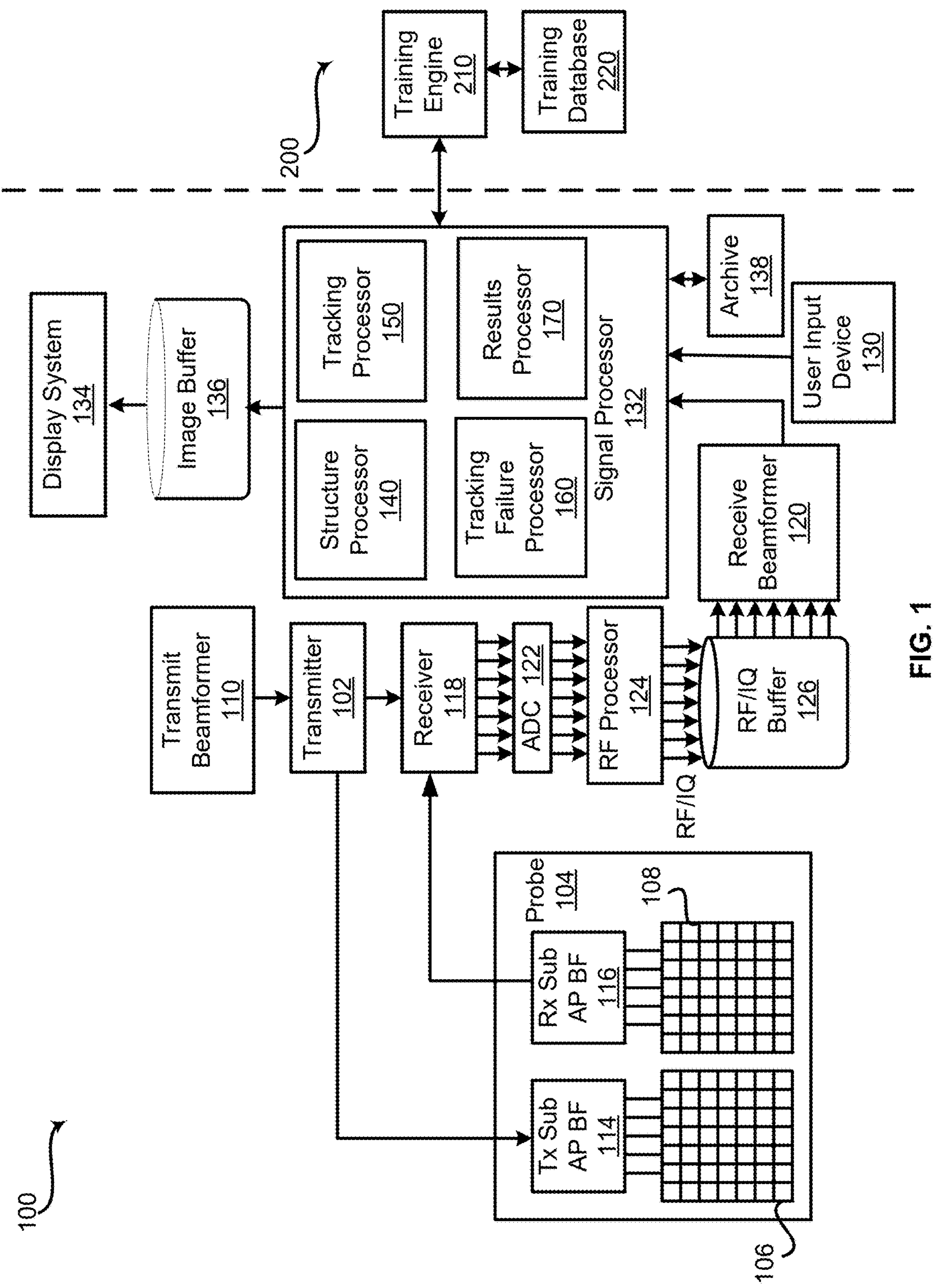
FIG. 1 is a block diagram of an exemplary ultrasound system that is operable to provide guidance while obtaining ultrasound images during pelvic examinations, in accordance with various embodiments.

Certain embodiments may be found in a method and system for provided for guidance for patients in pelvic examinations for ultrasound imaging. Aspects of the present disclosure have the technical effect of providing frame-by-frame visual feedback regarding maneuvers being performed by a patient in order for users to determine whether the maneuver is being accurately performed.

Various embodiments have the technical effect of obtaining ultrasound images of a maneuver in order to perform a diagnostic evaluation of anatomical structures. Certain embodiments have the technical effect of providing real-time, frame-by-frame, accurate, and visual feedback on the progress of a maneuver to a patient and/or clinician. Certain embodiments have the technical effect of reducing errors while providing diagnostic evaluation of anatomical structures during various maneuvers. Certain embodiments have the technical effect of improving the quality of diagnostic evaluations by analyzing ultrasound images to provide visual cues and information on a real-time basis.

Various embodiments have the technical effect of providing an automated system for identifying maneuvers and movement during the maneuvers in order to provide feedback to users, thereby aiding in diagnosis using ultrasound images and decreasing ultrasound scanning time for patients in many situations. Certain embodiments have the technical effect of providing an automated system for pelvic floor examinations. Various embodiments have the technical effect of providing real-time, quantifiable, and clinically relevant information to aide in diagnostic evaluations. Various embodiments provide visual feedback to users during diagnostic evaluations in order to allow users to be active participants in the diagnostic evaluation. Certain embodiment provide error detection during live tracking of a diagnostic evaluation in order to notify a user and/or solicit input from the user, and/or restart the automatic guidance.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized, and that structural, logical, and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising", "including", or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" is used to refer to an ultrasound mode, which can be one-dimensional (1D), two-dimensional (2D), three-dimensional (3D), or four-dimensional (4D), and comprising Brightness mode (B-mode), Motion mode (M-mode), Color Motion mode (CM-mode), Color Flow mode (CF-mode), Pulsed Wave (PW) Doppler, Continuous Wave (CW) Doppler, Contrast Enhanced Ultrasound (CEUS), and/or sub-modes of B-mode and/or CF-mode such as Harmonic Imaging, Shear Wave Elasticity Imaging (SWEI), Strain Elastography, Tissue Velocity Imaging (TVI), Power Doppler Imaging (PDI), B-flow, Micro Vascular Imaging (MVI), Ultrasound-Guided Attenuation Parameter (UGAP), and the like. The term, "ultrasound image," as used herein, is used to refer to ultrasound image and/or ultrasound image volumes, such as a bi-plane image, a single 2D image, a rendering of a volume (3D/4D), 2D bi-plane image slices extracted from a volume (3D/4D), and/or any suitable ultrasound image. In some examples, the ultrasound image may be a still image or an ultrasound clip. For purposes of this disclosure, the term "ultrasound image" may be used to refer to a single ultrasound frame, while the term "ultrasound clip" may be used to refer to a plurality of ultrasound frames acquired in sequence, each at a different point in time. When displayed, each of the ultrasound frames in an ultrasound clip is displayed in sequence, which allows the ultrasound clip to display motion in a manner similar to a movie. The ultrasound clip, which is also commonly referred to as a cine loop by those skilled in the art, may include either 2D or 3D ultrasound frames acquired over a period of time. In some examples, the ultrasound images and/or ultrasound clips may be displayed in real-time and/or may be stored in a computer readable medium for later retrieval.

Furthermore, the term processor or processing unit, as used herein, refers to any type of processing unit that can carry out the required calculations needed for the various embodiments, such as single or multi-core: CPU, Accelerated Processing Unit (APU), Graphic Processing Unit (GPU), Digital Signal Processor (DSP), Field-Programmable Gate Array (FPGA), Application-Specific Integrated Circuit (ASIC), or a combination thereof.

It should be noted that various embodiments described herein that generate or form images may include processing for forming images that in some embodiments includes beamforming and in other embodiments does not include beamforming. For example, an image can be formed without beamforming, such as by multiplying the matrix of demodulated data by a matrix of coefficients so that the product is the image, and wherein the process does not form any "beams". In addition, forming of images may be performed using channel combinations that may originate from more than one transmit event (e.g., synthetic aperture techniques).

In various embodiments, ultrasound processing to form images is performed, for example, including ultrasound beamforming, such as receive beamforming, in software, firmware, hardware, or a combination thereof. One implementation of an ultrasound system having a software beamformer architecture formed in accordance with various embodiments is illustrated in FIG. 1.

FIG. 1 is a block diagram of an exemplary ultrasound system 100 that is operable to obtain an ultrasound volume from bi-plane ultrasound scanning. Referring to FIG. 1, there is shown an ultrasound system 100 and a training system 200. The ultrasound system 100 comprises a transmitter 102, an ultrasound probe 104, a transmit beamformer 110, a receiver 118, a receive beamformer 120, analog-to-digital (A/D) converters 122, a radio frequency (RF) processor 124, a RF quadrature (RF/IQ) buffer 126, a user input device 130, a signal processor 132, an image buffer 136, a display system 134, and an archive 138.

The transmitter 102 may comprise suitable logic, circuitry, interfaces, and/or code that may be operable to drive an ultrasound probe 104. The ultrasound probe 104 may comprise a two-dimensional (2D) array of piezoelectric elements. In various embodiments, the ultrasound probe 104 may be a matrix array transducer or any suitable transducer operable to acquire 2D and/or 3D ultrasound image datasets. The ultrasound probe 104 may comprise a group of transmit transducer elements 106 and a group of receive transducer elements 108, that normally constitute the same elements. In certain embodiment, the ultrasound probe 104 may be operable to acquire ultrasound image data covering at least a substantial portion of an anatomy, such as an abdomen, a heart, a fetus, a lung, a blood vessel, or any suitable anatomical structure(s). The ultrasound probe 104 may be a curvilinear, convex, or phased array probe, as non-limiting examples.

The transmit beamformer 110 may comprise suitable logic, circuitry, interfaces and/or code that may be operable to control the transmitter 102 which, through a transmit sub-aperture beamformer 114, drives the group of transmit transducer elements 106 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes are received by the receive transducer elements 108.

The group of receive transducer elements 108 in the ultrasound probe 104 may be operable to convert the received echoes into analog signals, undergo sub-aperture beamforming by a receive sub-aperture beamformer 116 and are then communicated to a receiver 118. The receiver 118 may comprise suitable logic, circuitry, interfaces and/or code that may be operable to receive the signals from the receive sub-aperture beamformer 116. The analog signals may be communicated to one or more of the plurality of A/D converters 122.

The plurality of A/D converters 122 may comprise suitable logic, circuitry, interfaces, and/or code that may be operable to convert the analog signals from the receiver 118 to corresponding digital signals. The plurality of A/D converters 122 are disposed between the receiver 118 and the RF processor 124. Notwithstanding, the disclosure is not limited in this regard. Accordingly, in some embodiments, the plurality of A/D converters 122 may be integrated within the receiver 118.

The RF processor 124 may comprise suitable logic, circuitry, interfaces, and/or code that may be operable to demodulate the digital signals output by the plurality of A/D converters 122. In accordance with an embodiment, the RF processor 124 may comprise a complex demodulator (not shown) that is operable to demodulate the digital signals to form I/Q data pairs that are representative of the corresponding echo signals. The RF or I/Q signal data may then be communicated to an RF/IQ buffer 126. The RF/IQ buffer 126 may comprise suitable logic, circuitry, interfaces, and/or code that may be operable to provide temporary storage of the RF or I/Q signal data, which is generated by the RF processor 124.

The receive beamformer 120 may comprise suitable logic, circuitry, interfaces and/or code that may be operable to perform digital beamforming processing to, for example, sum the delayed channel signals received from RF processor 124 via the RF/IQ buffer 126 and output a beam summed signal. The resulting processed information may be the beam summed signal that is output from the receive beamformer 120 and communicated to the signal processor 132. In accordance with some embodiments, the receiver 118, the plurality of A/D converters 122, the RF processor 124, and the beamformer 120 may be integrated into a single beamformer, which may be digital. In various embodiments, the ultrasound system 100 comprises a plurality of receive beamformers 120.

The user input device 130 may be utilized to input patient data, scan parameters, settings, select protocols and/or templates, select displacement parameters to acquire displacements in one more directions and/or rotational displacements, manipulate the acquired 3D volume, and the like. In an exemplary embodiment, the user input device 130 may be operable to configure, manage, and/or control operation of one or more components and/or modules in the ultrasound system 100. In this regard, the user input device 130 may be operable to configure, manage, and/or control operation of the transmitter 102, the ultrasound probe 104, the transmit beamformer 110, the receiver 118, the receive beamformer 120, the RF processor 124, the RF/IQ buffer 126, the user input device 130, the signal processor 132, the image buffer 136, the display system 134, and/or the archive 138. The user input device 130 may include button(s), rotary encoder (s), a touchscreen, motion tracking, voice recognition, a mousing device, keyboard, camera, and/or any other device capable of receiving a user directive. In certain embodiments, one or more of the user input devices 130 may be integrated into other components, such as the display system 134 or the ultrasound probe 104, for example. As an example, user input device 130 may include a touchscreen display.

The signal processor 132 may comprise suitable logic, circuitry, interfaces and/or code that may be operable to process ultrasound scan data (i.e., summed IQ signal) for generating ultrasound images for presentation on a display system 134. The signal processor 132 is operable to perform one or more processing operations according to a plurality of selectable ultrasound modalities on the acquired ultrasound scan data. In an exemplary embodiment, the signal processor 132 may be operable to perform display processing and/or control processing, among other things. Acquired ultrasound scan data may be processed in real-time during a scanning session as the echo signals are received. Additionally or alternatively, the ultrasound scan data may be stored temporarily in the RF/IQ buffer 126 during a scanning session and processed in less than real-time in a live or off-line operation. In various embodiments, the processed image data can be presented at the display system 134 and/or may be stored at the archive 138. The archive 138 may be a local archive, a Picture Archiving and Communication System (PACS), a remote archive, or any suitable device for storing images and related information.

The signal processor 132 may be one or more central processing units, microprocessors, microcontrollers, and/or the like. The signal processor 132 may be an integrated component, or may be distributed across various locations, for example. In an exemplary embodiment, the signal processor 132 may comprise a structure processor 140, a tracking processor 150, a tracking failure processor 160, and a results processor 170. The signal processor 132 may be capable of receiving input information from a user input device 130 and/or archive 138, generating an output displayable by a display system 134, and manipulating the output in response to input information from a user input device 130, among other things. The signal processor 132, structure processor 140, tracking processor 150, tracking failure processor 160, and results processor 170 may be capable of executing any of the method(s) and/or set(s) of instructions discussed herein in accordance with the various embodiments, for example.

The ultrasound system 100 may be operable to continuously acquire ultrasound scan data at a frame rate that is suitable for the imaging situation in question. Typical frame rates range from 20-120 but may be lower or higher. The acquired ultrasound scan data may be displayed on the display system 134 at a display-rate that can be the same as the frame rate, or slower or faster. An image buffer 136 is included for storing processed frames of acquired ultrasound scan data. Preferably, the image buffer 136 is of sufficient capacity to store at least several minutes' worth of frames of ultrasound scan data. The frames of ultrasound scan data are stored in a manner to facilitate retrieval thereof according to its order or time of acquisition. The image buffer 136 may be embodied as any known data storage medium.

The signal processor 132 may include a structure processor 140 that comprises suitable logic, circuitry, interfaces, and/or code that may be operable to acquire ultrasound images of anatomical structures such as cardiac structures, gastroenterological structures, urological structures, reproductive structures, cardiac structures, pulmonary structures, pelvic structures, and/or any suitable anatomical structures, identify the anatomical structures, and segment the anatomical structures in the ultrasound images. The ultrasound images may be ultrasound images and/or ultrasound image volumes, such as a bi-plane image, a single 2D image, a rendering of a volume (3D/4D), 2D bi-plane image slices extracted from a volume (3D/4D), and/or any suitable ultrasound images. In some examples, the ultrasound images are still images and/or ultrasound clips. Additionally or alternatively, the ultrasound images are acquired and displayed live for viewing on a display 134.

In an exemplary embodiment, the structure processor 140 may acquire ultrasound images of an anatomical structure using an ultrasound probe 104. In some examples, the structure processor 140 may receive user input representing one or more landmark points relative to one or more anatomical structures. For example, the ultrasound probe 104 may capture ultrasound images, and the structure processor 140 may present the ultrasound images to a user on a display system 134. In some examples, the structure processor 140 may display the ultrasound images in a pre-mode setting (e.g., before the structure processor begins capturing ultrasound images related to a diagnostic exam). For example, upon placing the ultrasound probe 104 on a user, the structure processor 140 may begin a pre-mode setting and display a first ultrasound image of an ultrasound scan. In some examples, the user may provide an input designating one or more landmark points in the ultrasound images while in the pre-mode setting. The input may be, for example, a point designating a landmark, a second point designating a second landmark, a line from a first landmark point to a second landmark point, a line from the second landmark point to the first landmark point, etc. In some other examples, the structure processor 140 may compute landmark point(s) of the anatomical structures using a deep learning-based segmentation algorithm.

The structure processor 140 may use the landmark point (s) to identify anatomical structures in the ultrasound images. For example, an input line may be drawn from a first landmark point to a second landmark point, a second landmark point to a first landmark point, etc. The structure processor 140 may use the input line to identify landmark points on or near anatomical structures, such as pelvic structures (e.g., the symphysis pubis (SP), levator ani (LA), uterus, bladder, or anal canal). In some examples, the input line may be drawn from the symphysis pubis to the levator ani.

The structure processor 140 may segment the anatomical structures in order to present the anatomical structures to the user. In some examples, the structure processor 140 may display the ultrasound images in real-time (e.g., live view) and/or store the ultrasound images in the archive 138 and/or any suitable data storage medium.

In some examples, the structure processor 140 may display instructions for performing a maneuver while the ultrasound scan of the maneuver is being captured. In some other examples, instructions for performing the maneuver may be provided externally (e.g., verbally by a clinician, visually by an external device, etc.). The ultrasound probe 104 may obtain ultrasound images while the instructions are being provided to the user either via the display. The instructions may be displayed in certain portions of the user interface while the user is performing the maneuver. In some examples, the maneuver is a pelvic maneuver and may be a contracting maneuver or an expanding maneuver.

Figure 2:
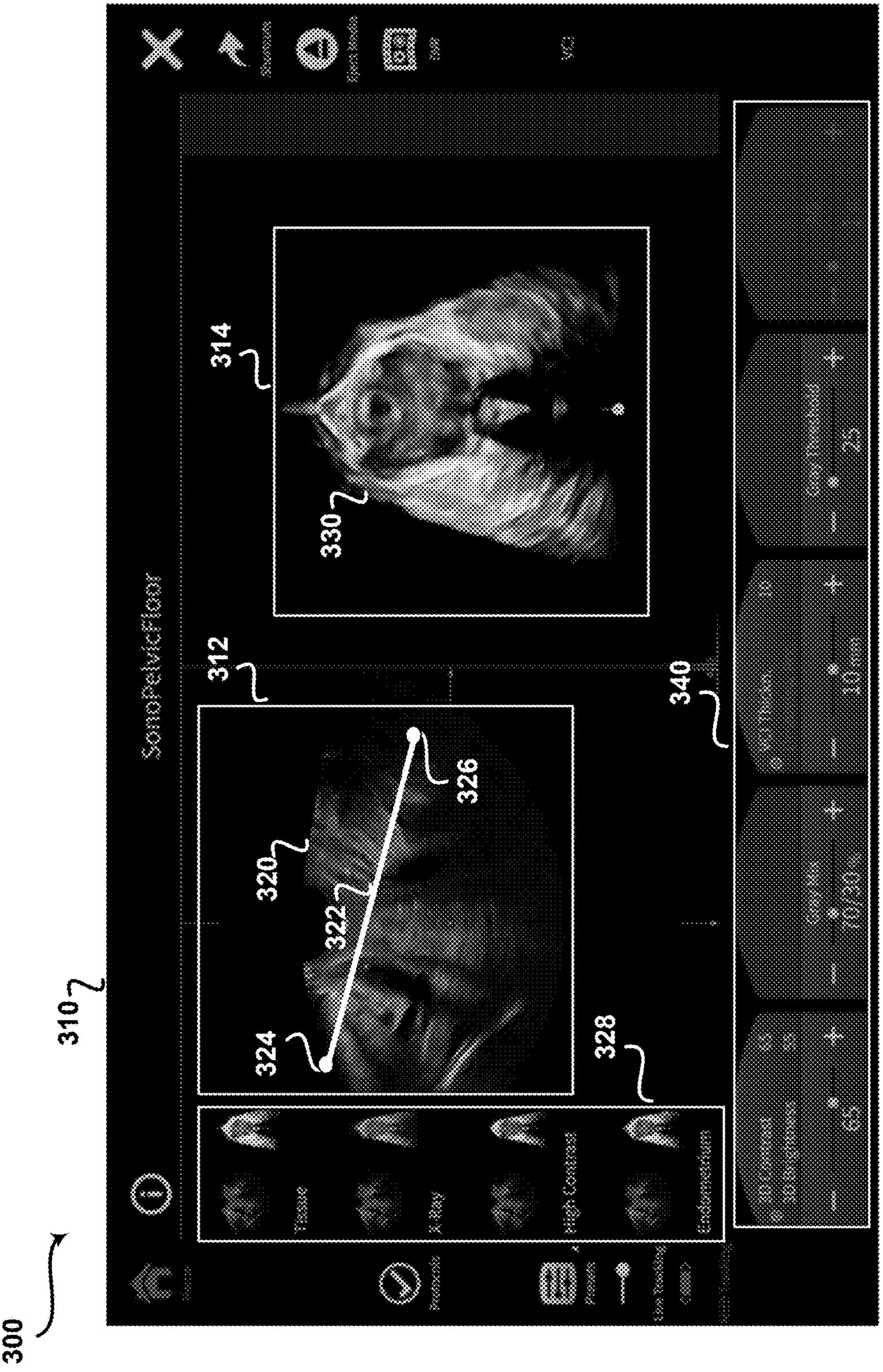
FIG. 2 is an exemplary display of an ultrasound image in a pre-mode setting prior to providing guidance, in accordance with various embodiments.

FIG. 2 provides a display 300 including a user interface 310. The user interface 310 may depict the ultrasound image 320 obtained via an ultrasound probe 104 and an input line 322 obtained via user input. In some examples, the user interface 310 may be activated and/or generated by the structure processor 140. The ultrasound image 320 may be acquired by the ultrasound probe 104 and displayed on a first portion 312 of the user interface 310. Although the ultrasound image 320 is depicted on a first portion 312 of the user interface 310, the ultrasound image 320 may be positioned on a right side, top side, bottom side, left side, or other portion of the user interface 310.

In some examples, the ultrasound image 320 may be displayed when the ultrasound probe 104 is placed on a patient and may be a first ultrasound image of an ultrasound clip. The ultrasound image 320 may be displayed in a pre-mode setting, which displays the ultrasound image 320 and allows a user to draw the input line 322 on the ultrasound image 320. Additionally or alternatively, the pre-mode setting may also allow the user to configure or adjust parameters related to the ultrasound acquisition. For example, the user interface 310 may include settings 328 for obtaining the ultrasound scan. For example, the user interface 310 may include a tissue setting, an x-ray setting, a high contrast setting, and/or an endometrium setting, as non-limiting examples. Each of the settings 328 may contain pre-configured parameters for obtaining and/or displaying ultrasound images. Additionally or alternatively, a user may preconfigure other settings which may appear on the user interface 310. Although the settings 328 are depicted on a left-hand side of the user interface 310, the settings 328 may be placed on other areas of the user interface 310, including a top of the screen, a bottom, or right side of the user interface 310. Additionally or alternatively, the user interface may include a tool 340 to manually adjust parameters for obtaining and/or displaying ultrasound images.

While in the pre-mode setting, a user may provide an input line 322 from landmark point 324 to landmark point 326. Although the input line 322 is depicted from landmark point 324 to landmark point 326, the input line 322 may be drawn from landmark point 326 to landmark point 324. The landmark point 324 and the landmark point 326 may be related to one or more anatomical structures. In some examples, the anatomical structures are pelvic anatomical structures. For example, the pelvic anatomical structures may be the symphysis pubis, levator ani, uterus, bladder, or anal canal. In some examples, the input line may be drawn from the symphysis pubis to the levator ani. In some other examples, the structure processor 140 may compute the landmark point(s) of the anatomical structures using a deep learning-based segmentation algorithm.

Once the user has drawn the input line 322, the structure processor 140 may generate an ultrasound image 330 on a second portion 314 of the user interface 310. The ultrasound image 330 may be an ultrasound image 330 along a second plane, such as a C-plane. After a user has completed the input line 322 from the landmark point 324 to the landmark point 326, the ultrasound probe 104 may automatically begin capturing a series of ultrasound images as will be described further below with regards to FIG. 3. The ultrasound images 330 may be displayed in real-time and/or may be stored in an archive or other similar storage medium.

Figure 3:
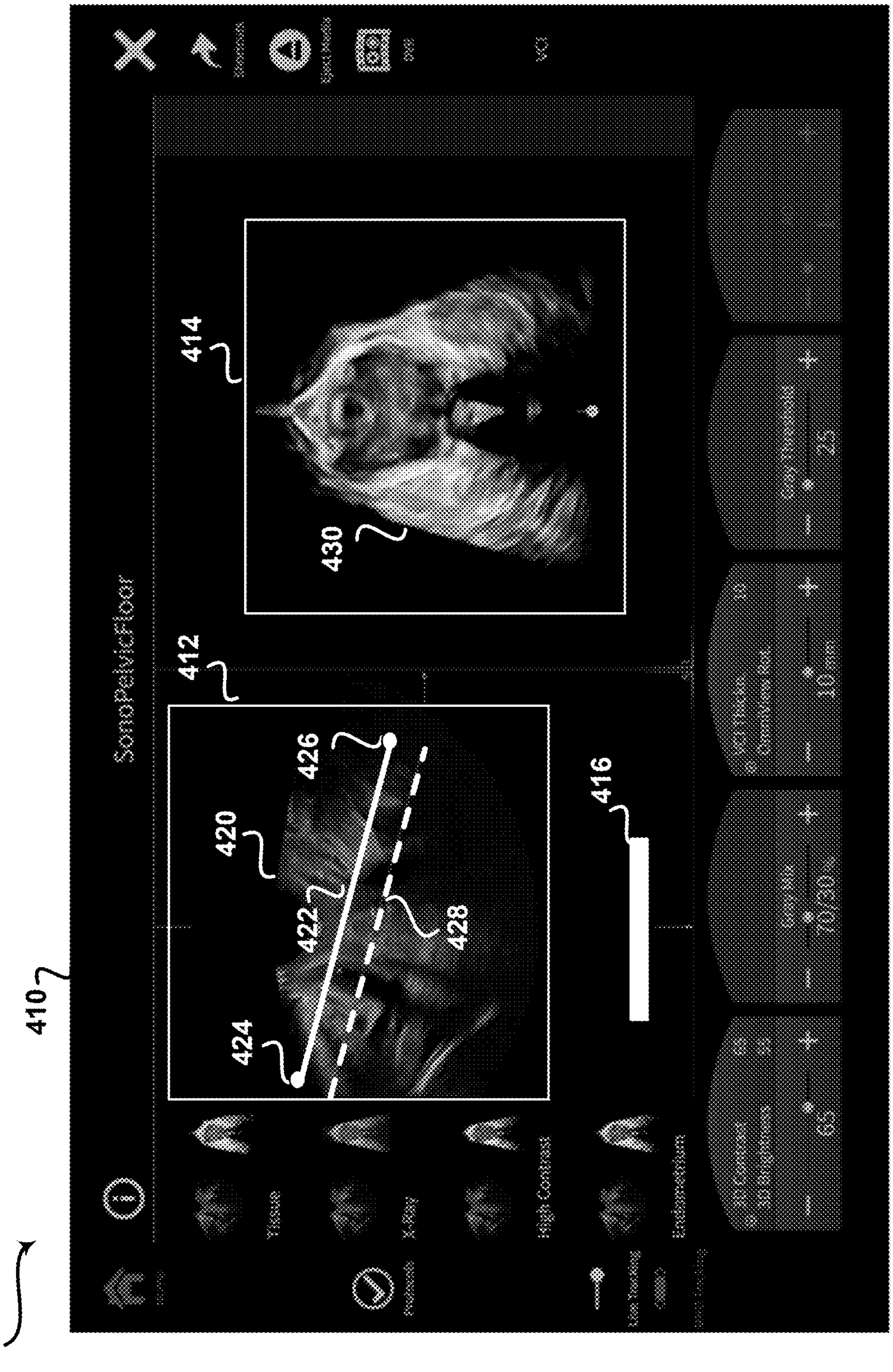
FIG. 3 is an exemplary display of an ultrasound image while providing guidance based on tracking anatomical structures during a pelvic examination, in accordance with various embodiments.

FIG. 3 is an example display 400 including user interface 410. The user interface 410 may depict the ultrasound image 420 obtained via the ultrasound probe 104 after the input line 422 has been obtained via user input. Ultrasound image 420 may be an ultrasound image frame captured subsequent to the ultrasound image 320 of FIG. 2. The user interface 410 may include the input line 422 and landmark points 424 426. In some examples, once the user has finished drawing the input line 422, a second line 428 may be presented on ultrasound image 420. The second line 428 may be a dashed line, a line of a different color, or any other type of graphical overlay that indicates a rendered volume structure 430 between the input line 422 and the second line 428. The volume structure 430 rendered may be a corresponding C-place ultrasound volume of the ultrasound image 420. The volume structure 430 may be a portion of an ultrasound volume of one or more anatomical structures.

In some examples, the user interface 410 automatically displays the volume structure 430 after the input line 322 has been drawn and the structure processor 140 has segmented the ultrasound image 420. In some examples, the ultrasound image 420 and the volume structure 430 may be displayed simultaneously on the user interface for 410. For example, the ultrasound image 420 may be displayed in a first portion 412 of the user interface 410 and the volume structure 430 may be displayed in a second portion 414 of the user interface 410. In some examples, the user interface 410 may display instructions for performing a maneuver while the ultrasound scan is being captured. In some other examples, instructions may be provided externally (e.g., by a clinician and/or by an external device) and may be visual instructions, verbal instructions, or both.

The user interface 410 may include a tracking graphic 416. The tracking graphic 416 may expand and/or contract relative to a distance between landmark point 424 and landmark point 426 as the underlying anatomical structures move when a maneuver is performed, in order to provide a visual indication of the maneuver. The tracking graphic 416 may indicate a direction of the movement, degree of the movement, and/or whether the movement is an expanding or contracting movement. For example, as a patient performs a contracting maneuver, the tracking graphic 416 may contract, and/or as a patient performs an expanding movement, the tracking graphic 416 may expand in order to provide feedback to the user(s) regarding whether the patient is performing a correct movement (e.g., expanding or contracting). In some examples, the tracking graphic 416 may be fully expanded as shown in FIG. 3. In some other examples, the tracking graphic 416 may be contracted as will be explained further below with regards to FIG. 5.

Referring to FIG. 1, the signal processor 132 may include a tracking processor 150 that comprises suitable logic, circuitry, interfaces, and/or code that may be operable to track movement of the anatomical structures based on the landmark point(s). In some examples, the tracking processor 150 may use an algorithm to track the movement of the anatomical structures. For example, tracking may be performed on the landmark point(s) obtained from the anatomical structures by utilizing Lucas-Kanade or another similar optical flow algorithm, which determines the relevant movement of the anatomical structures identified by the structure processor 140 from frame to frame.

A clinician, for example, may request a patient to perform an expanding maneuver and/or a contracting maneuver, while obtaining an ultrasound scan. While the ultrasound scan is being performed, the ultrasound images may be analyzed by the tracking processor 150 in order to determine whether the movement is an expanding or contracting movement. In some examples, as the movement is being performed, the tracking processor 150 may present a live tracking graphic 416 to indicate whether the movement being performed by the user is a contracting movement or an expanding movement. In some examples, the live tracking graphic 416 may expand and/or contract based on the movement being performed by the user in order to provide a user, a clinician, and/or a patient with information regarding the movement.

Additionally or alternatively, the tracking processor 150 may analyze movements to determine a distance between landmark points located on anatomical structure(s) in ultrasound images. For example, the tracking processor 150 may calculate a distance between two anatomical structures, such as two pelvic structures using landmark point(s). In some examples, the distance may be calculated between the SP and the LA anatomical structures. The distance between each of the anatomical structures may be calculated for each ultrasound image (e.g., each ultrasound image frame) and/or rendered ultrasound volume and may be recorded in memory or other suitable storage medium. In some examples, a distance and/or identifier may be recorded for each frame. Additionally or alternatively, the tracking processor 150 may provide the distances for each ultrasound image and/or ultrasound volume to the tracking failure processor 160 and/or to the results processor 170.

Referring to FIG. 1, the signal processor 132 may include a tracking failure processor 160 that comprises suitable logic, circuitry, interfaces, and/or code that may be operable to track the variance of landmark point(s) and/or determine errors in tracking movement of the anatomical structures. In some examples, the tracking failure processor 160 may calculate statistics, such as one or more variances, for each ultrasound image in order to capture a shape, geometry, and/or relationship between landmark points within the ultrasound image. In some examples, the variance of the landmark point(s) is calculated using principal component analysis. For example, two eigen values may be calculated to capture a relationship between landmark points of one or more anatomical structures. The two eigen values may be captured of an ultrasound image such the ultrasound image 320 captured during a pre-mode setting as described in FIG. 2. Eigen values may be captured for subsequent ultrasound images acquired and compared to the ultrasound image 320 captured during the pre-mode setting. Additionally or alternatively, the eigen values may be calculated for each ultrasound image in an ultrasound clip and compared to eigen values of subsequent ultrasound images.

A variance of the landmark point(s) in the first frame may be calculated for comparison with variances of subsequent captured ultrasound image frames. In some examples, if the variance between the landmark points in subsequent ultrasound images (relative to a first ultrasound image and/or previous ultrasound images captured) is greater than a threshold amount, the tracking failure processor 160 may flag a tracking failure error. In some examples, a threshold for flagging a tracking failure may be input by a user or may be a predetermined threshold relative to a first ultrasound frame captured or a previous ultrasound frame captured.

Once the tracking failure processor 160 determines an error has occurred in tracking, the tracking failure processor 160 may inform the structure processor 140 and/or the tracking processor 150 that tracking has failed for the cine or series of ultrasound images being captured. In some examples, the structure processor 140, the tracking processor 150, and/or the tracking failure processor 160 may return to the pre-mode setting and/or restart capturing subsequent the ultrasound scan. In some examples, the tracking failure processor 160 may display a notification on the display 134 to provide information regarding the tracking failure. Additionally or alternatively, the tracking failure processor 160 may display options for a user to restart tracking of a maneuver and/or restart the ultrasound scan.

Figure 4:
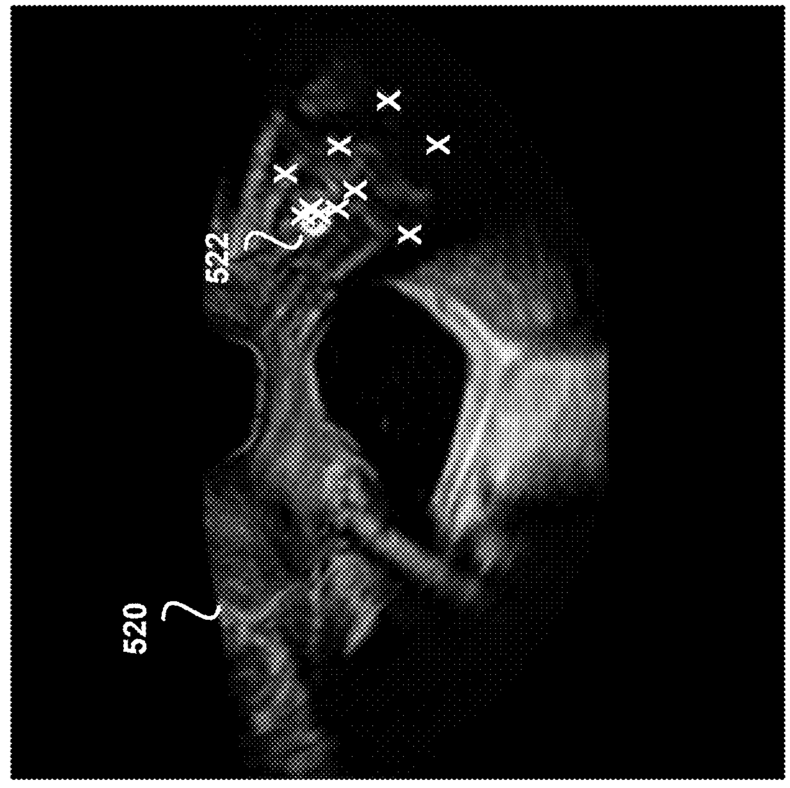
FIG. 4 is an exemplary illustration of a tracking failure while providing guidance during a pelvic examination, in accordance with various embodiments.
Figure 4:
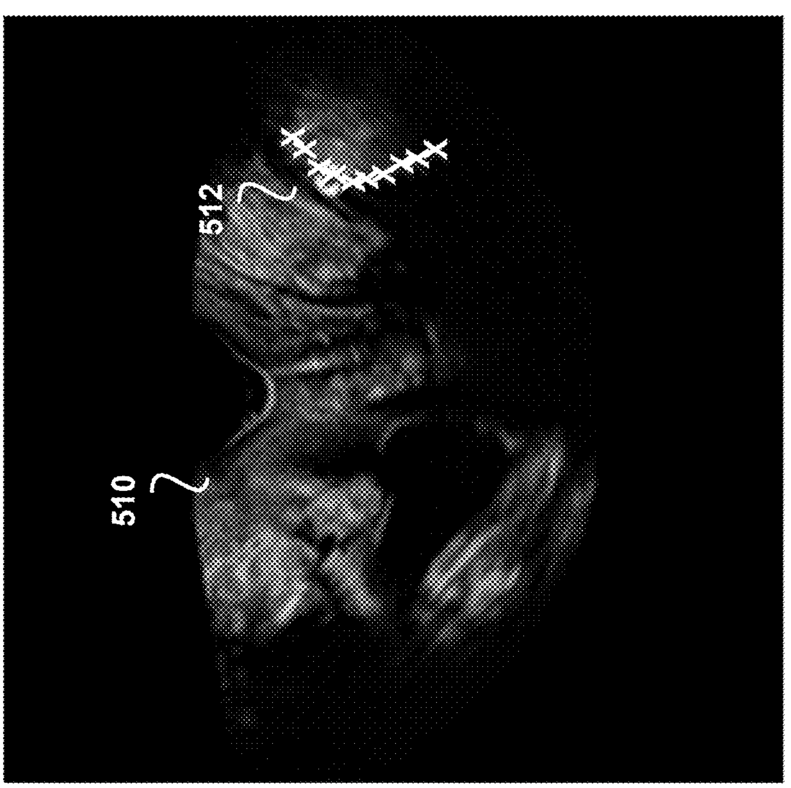

FIG. 4 is a graphical illustration 500 of tracking of landmark points 512 522 in ultrasound images 510 520. The tracking of landmark points 512 522 may be performed by a tracking processor 150. In some examples, a variance between landmark points 512 in ultrasound image 510 is calculated by the tracking processor 150. In some examples, ultrasound image 510 may be a first ultrasound image frame captured in a pre-mode setting. Variances may be calculated for subsequent ultrasound images, such as ultrasound image 520. Variances may be calculated for landmark points that are located on a same anatomical structure or on different anatomical structures. In some examples, if the difference between the variance of landmark points 512 and landmark points 522 is greater than a threshold amount, the tracking failure processor 160 may present a notification that tracking of a maneuver in ultrasound images has failed and/or may restart the procedure of providing guidance to a user during an examination by returning to a pre-mode setting. Although ultrasound images 510 520 depict a plurality of landmark points, variances may be calculated between two landmark points in an ultrasound image and compared to variances of subsequently captured ultrasound images.

Figure 5:
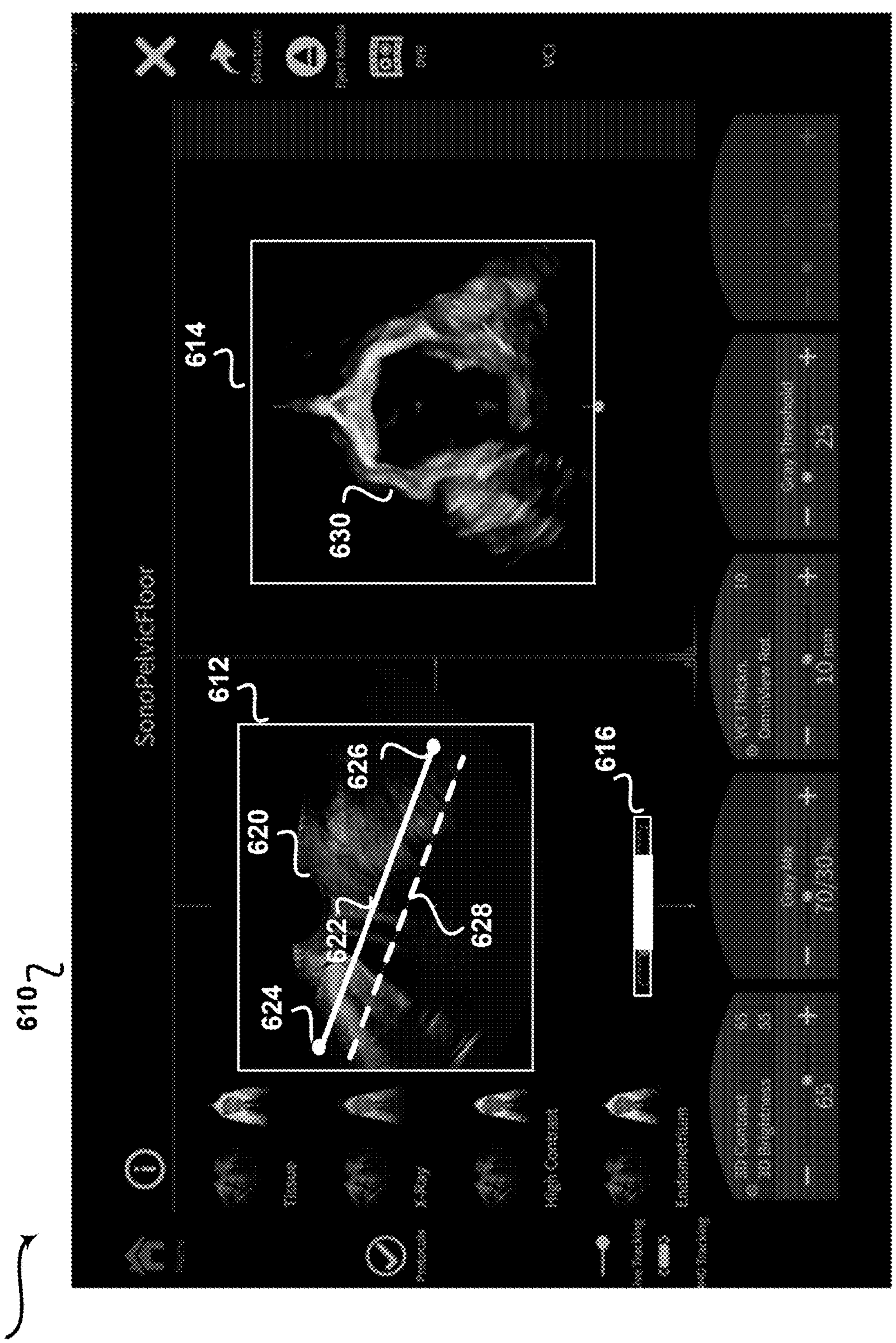
FIG. 5 is a second exemplary display of an ultrasound image while providing guidance based on tracking anatomical structures during a pelvic examination, in accordance with various embodiments.

FIG. 5 is an exemplary display 600 including user interface 610. The user interface 610 may depict the ultrasound image 620 obtained via the ultrasound probe 104 after the input line 622 has been obtained via user input. The user interface 610 may include the input line 622 and landmark points 624 626. In some examples, a second line 628 may be presented on ultrasound image 620. The second line 622 may be a dashed line, a line of a different color, or any other type of graphical overlay that indicates a volume structure 630 between the input line 622 and the second line 628 that may be rendered on the user interface 610. For example, a corresponding C-plane of the ultrasound image 620 may be rendered as the volume structure 630 on the user interface 610. The volume structure 630 may be a portion of an ultrasound volume of one or more anatomical structures. In some examples, ultrasound image 620 may be displayed in a first portion 612 of the user interface 610 and volume structure 630 may be displayed on a second portion 614 of the user interface 610. In some examples, the ultrasound image 620 and the volume structure 630 may be displayed simultaneously in a split screen or a side-by-side display on the user interface 610.

Ultrasound image 620 may be an ultrasound image frame captured subsequent to the ultrasound image 320 of FIG. 2. In some examples, the user interface 610 may display instructions for performing a maneuver while the ultrasound scan is being captured. In some other examples, instructions may be provided externally (e.g., by a clinician and/or by an external device). The instructions may be provided verbally or visually.

The user interface 610 may include a tracking graphic 616. The tracking graphic 616 may expand and/or contract relative to a distance between landmark point 624 and landmark point 626 as the underlying anatomical structures move when a maneuver is performed. The tracking graphic 616 may indicate a direction of the movement, degree of the movement, and/or whether the movement is an expanding or contracting movement. For example, as a patient performs a maneuver, the tracking graphic 616 may contract to reflect the landmark points 624 626 moving towards and/or away from each other, as the patient performs the maneuver. In some examples, the tracking graphic 416 may be fully expanded as shown in FIG. 3 or may be contracted as depicted by the tracking graphic 616.

Referring to FIG. 1, the signal processor 132 may include a results processor 170 that comprises suitable logic, circuitry, interfaces, and/or code that may be operable to analyze the series of ultrasound images captured during the maneuver performed by the patient and select an ultrasound image that includes a largest distance between landmark points and an ultrasound image that includes a smallest distance between the landmark points in the series of ultrasound images captured. In some examples, the results processor 170 may receive stored or captured distances with corresponding ultrasound image frame information from the tracking processor 150 and/or a storage medium that may be analyzed to determine a minimum distance or a maximum distance. In some examples, a user may provide an input to indicate the completion of the examination and to stop the capturing of the ultrasound images.

In some examples, upon completion of the maneuver by the patient and the capturing of the ultrasound images, the results processor 170 may present on the display 134 options to view the ultrasound image with the smallest distance and the ultrasound image with the largest distance. In some examples, after the minimum and/or maximum distances are recorded, the ultrasound image frame corresponding to the minimum and maximum distances may be presented to the user automatically or an option may be provided on the screen in order for the user to select the display of the minimum or maximum distance. In some examples, the distance is a hiatal distance (HD). For example, the results processor may display a button that may be selected by a user to view the ultrasound image and corresponding ultrasound volume for a minimum distance and/or a button that may be selected by a user to view the ultrasound image and corresponding ultrasound volume for a maximum distance in the ultrasound cine captured. Additionally or alternatively, the results processor 170 may provide an indicator on a cine bar of the position(s) of the ultrasound image including the minimum distance and the ultrasound image including the maximum distance within the ultrasound clip.

Referring again to FIG. 1, the display system 134 may be any device capable of communicating visual information to a user. For example, a display system 134 may include a liquid crystal display, a light emitting diode display, and/or any suitable display or displays. The display system 134 can be operable to present ultrasound images 320, 330, 420, 430, 510, 520, 620, 630, and/or any suitable information.

The archive 138 may be one or more computer-readable memories integrated with the ultrasound system 100 and/or communicatively coupled (e.g., over a network) to the ultrasound system 100, such as a Picture Archiving and Communication System (PACS), a server, a hard disk, floppy disk, CD, CD-ROM, DVD, compact storage, flash memory, random access memory, read-only memory, electrically erasable and programmable read-only memory and/or any suitable memory. The archive 138 may include databases, libraries, sets of information, or other storage accessed by and/or incorporated with the signal processor 132, for example. The archive 138 may be able to store data temporarily or permanently, for example. The archive 138 may be capable of storing medical image data, data generated by the signal processor 132, and/or instructions readable by the signal processor 132, among other things.

In various embodiments, the archive 138 stores ultrasound images 320, 330, 420, 430, 510, 520, 620, 630, instructions for acquiring ultrasound images 320, 330, 420, 430, 510, 520, 620, 630, instructions for activating a user interface 310, 410, 610, instructions for identifying anatomical structures in ultrasound images, instructions for segmenting anatomical structures, instructions for tracking anatomical structures, instructions for presenting the anatomical structures with feedback, instructions for determining a tracking failure while obtaining ultrasound images, and instructions for presenting results of the ultrasound image acquisition.

Components of the ultrasound system 100 may be implemented in software, hardware, firmware, and/or the like. The various components of the ultrasound system 100 may be communicatively linked. Components of the ultrasound system 100 may be implemented separately and/or integrated in various forms. For example, the display system 134 and the user input device 130 may be integrated as a touchscreen display.

Still referring to FIG. 1, the training system 200 may comprise a training engine 210 and a training database 220. The training engine 210 may comprise suitable logic, circuitry, interfaces and/or code that may be operable to train the neurons of the deep neural network(s) (e.g., artificial intelligence model(s)) inferenced (i.e., deployed) by the structure processor 140, the tracking processor 150, the tracking failure processor 160, and the results processor 170. For example, the artificial intelligence model inferenced by the structure processor 140 may be trained to automatically identify anatomical structures from ultrasound images using database(s) 220 of classified ultrasound images of anatomical structures. As another example, the artificial intelligence model inferenced by the tracking processor 150, the tracking failure processor 160, and/or the results processor 170 may be trained to automatically identify landmark points, variances, and the like in an ultrasound image using database(s) 220 of classified ultrasound images.

In various embodiments, the databases 220 of training images may be a Picture Archiving and Communication System (PACS), or any suitable data storage medium. In certain embodiments, the training engine 210 and/or training image databases 220 may be remote system(s) communicatively coupled via a wired or wireless connection to the ultrasound system 100 as shown in FIG. 1. Additionally and/or alternatively, components or all of the training system 200 may be integrated with the ultrasound system 100 in various forms. In some examples, the training image databases 220 may be integrated with the archive 138 or vice versa.

Figure 6:
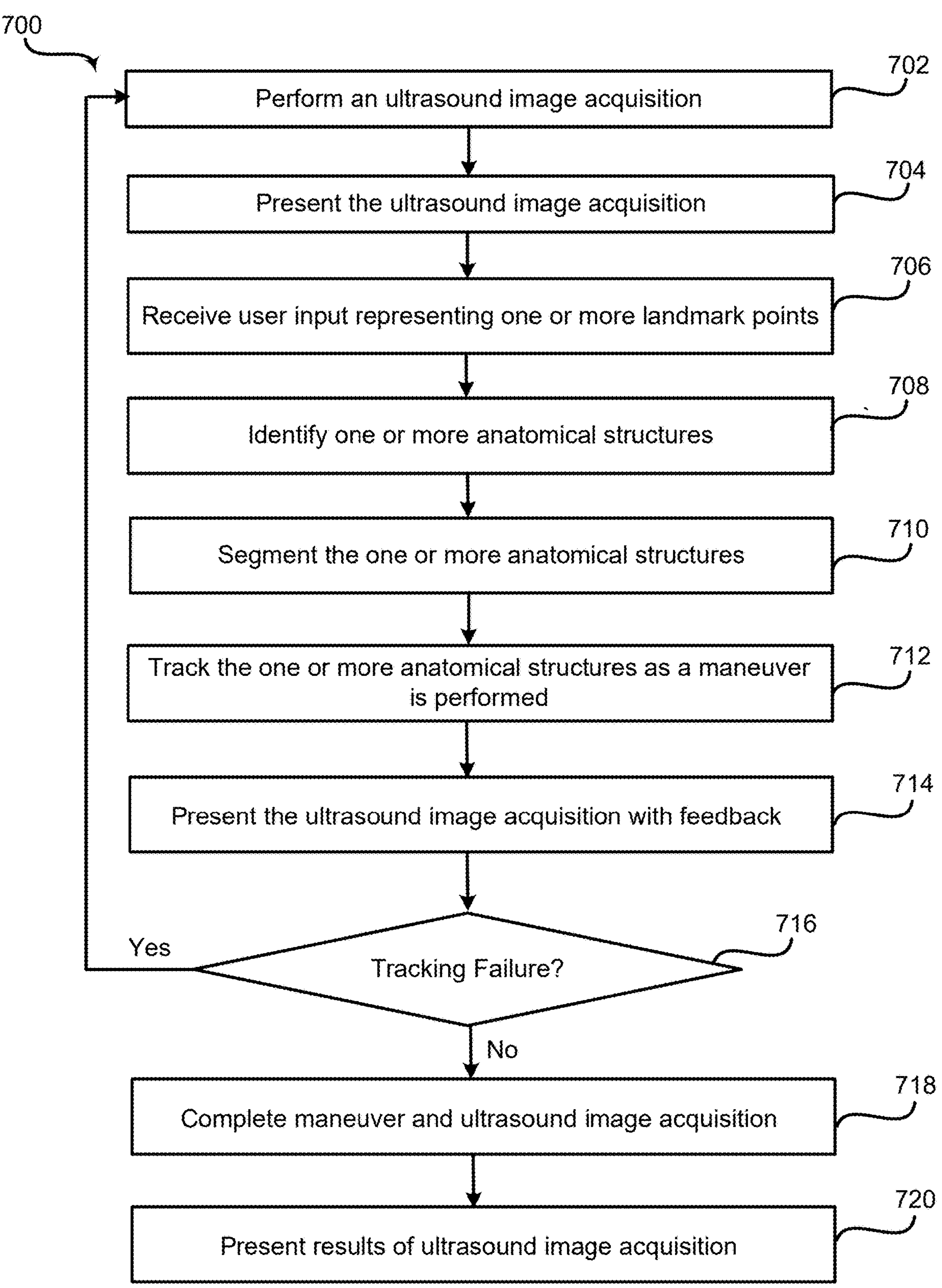
FIG. 6 is a flow chart illustrating exemplary steps 702-720 that may be utilized for providing guidance based on tracking anatomical structures during a pelvic examination, in accordance with various embodiments.

FIG. 6 is a flow chart 700 illustrating exemplary steps 702-720 that may be utilized for providing guidance during pelvic examinations with ultrasound imaging, in accordance with various embodiments. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 702, a signal processor 132, 140 of the ultrasound system 100 may be configured to acquire ultrasound images 320, 330, 420, 430, 510, 520, 620, 630. For example, a structure processor 140 may be configured to acquire ultrasound images 320, 520, 620, 630 using an ultrasound probe 104.

At step 704, a signal processor 132, 140 of the ultrasound system 100 may be configured to present the acquired ultrasound images 320, 330, 420, 430, 510, 520, 620, 630 on a user interface 310. For example, the structure processor 140 may be configured to activate the user interface 310 to display the ultrasound images 320, 330, 420, 430, 510, 520, 620, 630, which may be stored by the structure processor 140 in an archive 138 or other suitable computer readable medium.

At step 706, a signal processor 132, 140 of the ultrasound system 100 may be configured to receive user input representing one or more landmark points 324, 326, 424, 426, 624, 626. For example, the structure processor 140 may be configured to receive an input line 322 that may be used by the signal processor 132, 140 to determine landmark points 324, 326, 424, 426, 624, 626 for tracking anatomical structures.

At step 708, signal processor 132, 140 of the ultrasound system 100 may be configured to identify one or more anatomical structures using the input line 322, 422, 622, and/or the landmark points 324, 326, 424, 426, 624, 626. The landmark points 324, 326, 424, 426, 624, 626 and/or the anatomical structures may be stored by the structure processor 140 and/or provided to the tracking processor 150.

At step 710, a signal processor 132, 140 of the ultrasound system 100 may be configured to segment the anatomical structures. For example, the structure processor 140 may provide the landmark points 324, 326, 424, 426, 624, 626 and/or the anatomical structures to the tracking processor 150 and/or store the landmark points 324, 326, 424, 426, 624, 626 and/or anatomical structures in an archive and/or a suitable computer readable storage medium.

At step 712, a signal processor 132, 150 of the ultrasound system 100 may be configured to track the anatomical structure(s) using the landmark points 324, 326, 424, 426, 624, 626. For example, the tracking processor 150 may use the landmark points 324, 326, 424, 426, 624, 626 to track the anatomical structure(s) as a maneuver is being performed.

At step 714, a signal processor 132, 150 of the ultrasound system 100 may be configured to present the ultrasound image 420, 430, 620, 630, including feedback for guidance for the user in performing the maneuver. For example, the tracking processor 150 may present the ultrasound image 420, 620 and a volume structure 430, 630, with feedback regarding the maneuver being captured in the ultrasound image 420, 430, 620, 630. In some examples, the tracking processor 150 may present the ultrasound image 420, 620, and the volume structure 430, 630, with feedback to inform a user regarding whether the maneuver is being correctly performed (e.g., whether the maneuver is an expanding movement or a contracting movement).

At step 716, a signal processor 132, 160 of the ultrasound system 100 may be configured to determine whether there is an error in the tracking of the ultrasound image 420, 620. For example, the tracking failure processor 160 may calculate a variance between landmark points 324, 326, 424, 426, 512, 522, 624, 626, for each ultrasound image 320, 330, 420, 430, 510, 520, 620, 630, of the series of ultrasound images being captured and determine whether a difference in the variance of different ultrasound images exceeds a threshold amount. In some examples, the tracking failure processor 160 may reset the acquisition of ultrasound images 320, 330, 420, 430, 510, 520, 620, 630, and/or provide a notification on the display that there is a tracking failure error. If there is a tracking failure error, the method may return to any of steps 702-710.

At step 718, a signal processor 132, 170 of the ultrasound system 100 may be configured to complete the ultrasound acquisition. For example, the results processor 170 may receive user input indicating the examination has completed and that the ultrasound image acquisition is complete. In some examples, the results processor 170 may be configured to store the obtained ultrasound images 320, 330, 420, 430, 510, 520, 620, 630 as an ultrasound clip or cine. In some examples, the ultrasound clip or cine may be stored in an archive or similar data storage medium and/or presented to a user on the display 134.

At step 720, a signal processor 132, 170 of the ultrasound system 100 may be configured to present and/or analyze the results of the ultrasound image acquisition. For example, the results processor 170 may be configured to provide options after analyzing the ultrasound images. In some examples, the results processor may provide an ultrasound image including a maximum distance between landmark points and/or an ultrasound image including a minimum distance between landmark points. In some examples, the results processor 170 may provide the ultrasound image with a minimum distance and/or a maximum distance along with a corresponding rendered volume (or volume portion) of the corresponding C-plane for the ultrasound image.

Aspects of the present disclosure provide a method 700 and system 100 for automatic guidance in ultrasound scans including performing an ultrasound image acquisition 320,

330, 420, 430, 510, 520, 620, 630, using an ultrasound probe 104; presenting, by at least one processor 132, 140, the ultrasound image acquisition 320, 330, 420, 430, 510, 520, 620, 630. The method further includes receiving, by the at least one processor, 132, 140, user input representing one or more landmark points 324, 326, 424, 426, 512, 522, 624, 626, relative to one or more anatomical structures in the ultrasound image acquisition 320, 330, 420, 430, 510, 520, 620, 630, and identifying, by the at least one processor 132, 140, the one or more anatomical structures based on the one or more landmark points 324, 326, 424, 426, 512, 522, 624, 626. The method includes segmenting, by the at least one processor 132, 140, the one or more anatomical structures and tracking, by the at least one processor 132, 140, the one or more anatomical structures as a maneuver is performed by tracking the one or more landmark points 324, 326, 424, 426, 512, 522, 624, 626, wherein the maneuver causes the one or more anatomical structures to move, and presenting, by the at least one processor 132, 140, the ultrasound image acquisition 320, 330, 420, 430, 510, 520, 620, 630, with feedback regarding the movement of the one or more anatomical structures.

In an exemplary embodiment, the feedback includes a graphical representation 416, 616, related to the movement of the one or more anatomical structures and is reflective of one or more of a direction of the movement, degree of the movement, or whether the movement is an expanding or contracting movement. In an exemplary embodiment, the ultrasound image acquisition 320, 330, 420, 430, 510, 520, 620, 630, is automatically presented, by the at least one processor 132, 140, based on the ultrasound probe 104 being placed on a patient. In an exemplary embodiment, the landmark points 324, 326, 424, 426, 512, 522, 624, 626, are placed on the one or more anatomical structures via the user input.

In an exemplary embodiment, the method 700 includes computing, by the at least one processor 132, 150, a distance between two landmark points of the one or more landmark points in a series of ultrasound image 320, 330, 420, 430, 510, 520, 620, 630, of the ultrasound image acquisition 320, 330, 420, 430, 510, 520, 620, 630 as the maneuver is performed. In an exemplary embodiment, the distance between the two landmark points is a hiatal distance. In an exemplary embodiment, the identifying, by the at least one processor 132, 140, of the one or more anatomical structures comprises identifying one or more of a symphysis pubis, levator ani, uterus, bladder, or anal canal.

In an exemplary embodiment, the method 700 includes determining, by the at least one processor 132, 170, a minimal hiatal dimension (MHD) in a series of ultrasound image frames 320, 330, 420, 430, 510, 520, 620, 630 of the ultrasound image acquisition 320, 330, 420, 430, 510, 520, 620, 630 and presenting an ultrasound frame with a lowest MHD, an ultrasound frame with a highest MHD, or both upon completion of the maneuver.

In an exemplary embodiment, the tracking, by the at least one processor 132, 150, is performed using an optical flow algorithm. In an exemplary embodiment, the method 700 includes presenting the one or more segmented structures as one or more volume structures and presenting a portion of the one or more volume structures 430, 630 in a corresponding plane view.

In an exemplary embodiment, the ultrasound image acquisition includes a series of ultrasound image frames 320, 330, 420, 430, 510, 520, 620, 630, comparing, by the at least one processor 132, 160, a variance of the one or more landmark points 324, 326, 424, 426, 512, 522, 624, 626, in each ultrasound image frame of the series of ultrasound image frames 320, 330, 420, 430, 510, 520, 620, 630, to a variance in a first ultrasound image frame 320, 330, 510 of the series of ultrasound image frames 320, 330, 420, 430, 510, 520, 620, 630, and triggering an indication when the variance of the one or more landmark points meets a threshold variance relative to the first ultrasound image frame 320, 330, 510.

In an exemplary embodiment, the method 700 includes automatically restarting, by the at least one processor 132, 160, the tracking of the one or more landmark points 324, 326, 424, 426, 512, 522, 624, 626, providing a notification, or requesting user input when the threshold variance is triggered.

Various embodiments provide an ultrasound system 100 for automatic guidance in ultrasound scans including an ultrasound probe 104 configured to perform an ultrasound image acquisition 320, 330, 420, 430, 510, 520, 620, 630, and at least one processor 132, 140, 150, 160, 170, configured to: present the ultrasound image acquisition 320, 330, 420, 430, 510, 520, 620, 630; receive user input representing one or more landmark points 324, 326, 424, 426, 512, 522, 624, 626 relative to one or more anatomical structures in the ultrasound image acquisition 320, 330, 420, 430, 510, 520, 620, 630.

In an exemplary embodiment, the ultrasound system 100 is further configured to identify the one or more anatomical structures based on the one or more landmark points 324, 326, 424, 426, 512, 522, 624, 626; segment the one or more anatomical structures; track the one or more anatomical structures as a maneuver is performed by tracking the one or more landmark points 324, 326, 424, 426, 512, 522, 624, 626, wherein the maneuver causes the one or more anatomical structures to move; and present the ultrasound image acquisition 320, 330, 420, 430, 510, 520, 620, 630 with feedback regarding the movement of the one or more anatomical structures.

In an exemplary embodiment, the feedback comprises a graphical representation 416, 616 related to the movement of the one or more anatomical structures and is reflective of one or more of a direction of the movement, degree of the movement, or whether the movement is an expanding or contracting movement. In an exemplary embodiment, the ultrasound image acquisition 320, 330, 420, 430, 510, 520, 620, 630 is automatically presented based on the ultrasound probe 104 being placed on a patient.

In an exemplary embodiment, the at least one processor 132, 140, 150, 160, 170, is further configured to compute a distance between two landmark points 324, 326, 424, 426, 512, 522, 624, 626 of the one or more landmark points 324, 326, 424, 426, 512, 522, 624, 626 in a series of ultrasound image frames of the ultrasound image acquisition 320, 330, 420, 430, 510, 520, 620, 630 as the maneuver is performed. In an exemplary embodiment, the distance between the two landmark points is a hiatal distance.

In an exemplary embodiment, the identifying of the one or more anatomical structures comprises identifying one or more of a symphysis pubis, levator ani, uterus, bladder, or anal canal. In an exemplary embodiment, the ultrasound system 100 further includes determining a minimal hiatal dimension (MHD) in a series of ultrasound image frames of the ultrasound image acquisition 320, 330, 420, 430, 510, 520, 620, 630 and presenting an ultrasound frame with a lowest MHD, an ultrasound frame with a highest MHD, or both upon completion of the maneuver.

In an exemplary embodiment, the tracking, by the at least one processor 132, 140, 150, 160, 170, comprises an optical flow algorithm. In an exemplary embodiment, the ultrasound image acquisition 320, 330, 420, 430, 510, 520, 620, 630 comprises a series of ultrasound image frames 320, 330, 420, 430, 510, 520, 620, 630, and the at least one processor 132, 140, 150, 160, 170 is further configured to: compare a variance of the one or more landmark points 324, 326, 424, 426, 512, 522, 624, 626 in each ultrasound image frame of the series of ultrasound image frames 320, 330, 420, 430, 510, 520, 620, 630, to a variance in a first ultrasound image frame 320, 330, 510 of the series of ultrasound image frames 320, 330, 420, 430, 510, 520, 620, 630; and trigger an indication when the variance of the one or more landmark points 324, 326, 424, 426, 512, 522, 624, 626 meets a threshold variance relative to the first ultrasound image frame 320, 330, 510.

In an exemplary embodiment, the at least one processor 132, 140, 150, 160, 170 is further configured to restart the tracking of the one or more landmark points 324, 326, 424, 426, 512, 522, 624, 626, provide a notification, or request user input when the threshold variance is triggered. In an exemplary embodiment, the at least one processor 132, 140, 150, 160, 170, is further configured to present the one or more segmented structures as one or more volume structures and present a portion of the one or more volume structures 430, 630 in a corresponding plane view.

Various embodiments provide an ultrasound system 100 for automatic guidance in ultrasound scans comprising: an ultrasound probe 104 configured to perform an ultrasound image acquisition; and at least one processor 132, 140, 150, 160, 170, configured to: present the ultrasound image acquisition 320, 330, 420, 430, 510, 520, 620, 630; receive user input representing one or more landmark points 324, 326, 424, 426, 512, 522, 624, 626 relative to one or more anatomical structures in the ultrasound image acquisition 320, 330, 420, 430, 510, 520, 620, 630; identify the one or more anatomical structures based on the one or more landmark points 324, 326, 424, 426, 512, 522, 624, 626; segment the one or more anatomical structures; present one or more volume structures based on the one or more segmented anatomical structures and present a portion of the one or more volume structures 430, 630 in a corresponding plane view; track the one or more segmented anatomical structures as a maneuver is performed by tracking the one or more landmark points 324, 326, 424, 426, 512, 522, 624, 626, wherein the maneuver causes the one or more segmented anatomical structures to move; present the ultrasound image acquisition with a graphical representation 416, 616, of the movement of the one or more anatomical structures; determine a minimal hiatal dimension (MHD) in a series of ultrasound image frames 320, 330, 420, 430, 510, 520, 620, 630 of the ultrasound image acquisition 320, 330, 420, 430, 510, 520, 620, 630; and present an ultrasound frame with a lowest MHD, an ultrasound frame with a highest MHD, or both upon completion of the maneuver.

In an exemplary embodiment, the graphical representation 416, 616, is related to the movement of the one or more anatomical structures and is reflective of one or more of a direction of the movement, degree of the movement, or whether the movement is an expanding or contracting movement. In an exemplary embodiment, the ultrasound image acquisition 320, 330, 420, 430, 510, 520, 620, 630 comprises a series of ultrasound image frames 320, 330, 420, 430, 510, 520, 620, 630, and the at least one processor is further configured to: compare a variance of the one or more landmark points 324, 326, 424, 426, 512, 522, 624, 626 in each ultrasound image frame of the series of ultrasound image frames 320, 330, 420, 430, 510, 520, 620, 630 to a variance in a first ultrasound image frame 320, 330, 510 of the series of ultrasound image frames 320, 330, 420, 430, 510, 520, 620, 630; and trigger an indication when the variance of the one or more landmark points 324, 326, 424, 426, 512, 522, 624, 626 meets a threshold variance relative to the first ultrasound image frame 320, 330, 510.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As a non-limiting example, "x and/or y" means any element of the three-element set {(x), (y), (x, y), (x, z), (z, x)}. As another example, "x, y, and/or z" means any element of the seven-element set {(x), (y), (z), (x, y), (x, z), (y, z), (z, y), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" and/or "configured" to perform a function whenever the circuitry comprises the necessary hardware and code (if any is necessary) to perform the function, regardless of whether performance of the function is disabled, or not enabled, by some user-configurable setting.

Other embodiments may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for acquiring a target ultrasound image having a target view of one or more anatomical structures.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited.

Various embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for automatic guidance in ultrasound scans comprising:

performing an ultrasound image acquisition using an ultrasound probe;

presenting, by at least one processor, the ultrasound image acquisition;

receiving, by the at least one processor, user input representing an input line defining one or more landmark points relative to one or more anatomical structures in the ultrasound image acquisition;

identifying, by the at least one processor, the one or more anatomical structures based on the one or more landmark points;

segmenting, by the at least one processor, the one or more anatomical structures;

tracking, by the at least one processor, the one or more anatomical structures as a maneuver is performed by tracking the one or more landmark points, wherein the maneuver causes the one or more anatomical structures to move;

computing, by the at least one processor, a distance between two landmark points of the one or more landmark points in a series of ultrasound image frames of the ultrasound image acquisition as the maneuver is performed;

presenting, by the at least one processor, the ultrasound image acquisition with feedback regarding the movement of the one or more anatomical structures, wherein the feedback is reflective of one or more of a direction of the movement, degree of the movement, or whether the movement is an expanding or contracting movement; and determining, by the at least one processor, a minimal hiatal dimension (MHD) in a series of ultrasound image frames of the ultrasound image acquisition and presenting an ultrasound frame with a lowest MHD, an ultrasound frame with a highest MHD, or both upon completion of the maneuver.

2. The method of claim 1, wherein the feedback comprises a graphical representation related to the movement of the one or more anatomical structures.

3. The method of claim 1, wherein the ultrasound image acquisition is automatically presented, by the at least one processor, based on the ultrasound probe being placed on a patient.

4. The method of claim 1, wherein the landmark points are placed on the one or more anatomical structures via the user input.

5. The method of claim 1, wherein the distance between the two landmark points is a hiatal distance.

6. The method of claim 1, wherein the identifying, by the at least one processor, of the one or more anatomical structures comprises identifying one or more of a symphysis pubis, levator ani, uterus, bladder, or anal canal.

7. The method of claim 1, wherein the tracking, by the at least one processor, is performed using an optical flow algorithm.

8. The method of claim 1, further comprising presenting the one or more segmented structures as one or more volume structures and presenting a portion of the one or more volume structures in a corresponding plane view.

9. The method of claim 1, wherein the ultrasound image acquisition comprises a series of ultrasound image frames, and the method further comprising comparing, by the at least one processor, a variance of the one or more landmark points in each ultrasound image frame of the series of ultrasound image frames to a variance in a first ultrasound image frame of the series of ultrasound image frames, and triggering an indication when the variance of the one or more landmark points meets a threshold variance relative to the first ultrasound image frame.

10. The method of claim 9, further comprising automatically restarting, by the at least one processor, the tracking of the one or more landmark points, providing a notification, or requesting user input when the threshold variance is triggered.

11. An ultrasound system for automatic guidance in ultrasound scans comprising:

an ultrasound probe configured to perform an ultrasound image acquisition; and at least one processor configured to:

present the ultrasound image acquisition;

receive user input representing an input line defining one or more landmark points relative to one or more anatomical structures in the ultrasound image acquisition;

identify the one or more anatomical structures based on the one or more landmark points;

segment the one or more anatomical structures;

track the one or more anatomical structures as a maneuver is performed by tracking the one or more landmark points, wherein the maneuver causes the one or more anatomical structures to move;

compute a distance between two landmark points of the one or more landmark points in a series of ultrasound image frames of the ultrasound image acquisition as the maneuver is performed;

present the ultrasound image acquisition with feedback regarding the movement of the one or more anatomical structures, wherein the feedback is reflective of one or more of a direction of the movement, degree of the movement, or whether the movement is an expanding or contracting movement;

determine a minimal hiatal dimension (MHD) in a series of ultrasound image frames of the ultrasound image acquisition; and present an ultrasound frame with a lowest MHD, an ultrasound frame with a highest MHD, or both upon completion of the maneuver.

12. The ultrasound system of claim 11, wherein the feedback comprises a graphical representation related to the movement of the one or more anatomical structures.

13. The ultrasound system of claim 11, wherein the ultrasound image acquisition is automatically presented based on the ultrasound probe being placed on a patient.

14. The ultrasound system of claim 11, wherein the distance between the two landmark points is a hiatal distance.

15. The ultrasound system of claim 11, wherein the identifying of the one or more anatomical structures comprises identifying one or more of a symphysis pubis, levator ani, uterus, bladder, or anal canal.

16. The ultrasound system of claim 11, wherein the tracking, by the at least one processor, comprises an optical flow algorithm.

17. The ultrasound system of claim 16, wherein the ultrasound image acquisition comprises a series of ultrasound image frames, and the at least one processor is further configured to:

compare a variance of the one or more landmark points in each ultrasound image frame of the series of ultrasound image frames to a variance in a first ultrasound image frame of the series of ultrasound image frames; and trigger an indication when the variance of the one or more landmark points meets a threshold variance relative to the first ultrasound image frame.

18. The ultrasound system of claim 17, wherein the at least one processor is further configured to restart the tracking of the one or more landmark points, provide a notification, or request user input when the threshold variance is triggered.

19. The ultrasound system of claim 11, wherein the at least one processor is further configured to present the one or more segmented structures as one or more volume structures and present a portion of the one or more volume structures in a corresponding plane view.

20. An ultrasound system for automatic guidance in ultrasound scans comprising:

an ultrasound probe configured to perform an ultrasound image acquisition; and at least one processor configured to:

present the ultrasound image acquisition;

receive user input representing one or more landmark points relative to one or more anatomical structures in the ultrasound image acquisition;

identify the one or more anatomical structures based on the one or more landmark points;

segment the one or more anatomical structures;

present one or more volume structures based on the one or more segmented anatomical structures and present a portion of the one or more volume structures in a corresponding plane view;

track the one or more segmented anatomical structures as a maneuver is performed by tracking the one or more landmark points, wherein the maneuver causes the one or more segmented anatomical structures to move;

present the ultrasound image acquisition with a graphical representation of the movement of the one or more anatomical structures;

determine a minimal hiatal dimension (MHD) in a series of ultrasound image frames of the ultrasound image acquisition; and present an ultrasound frame with a lowest MHD, an ultrasound frame with a highest MHD, or both upon completion of the maneuver.

21. The ultrasound system of claim 20, wherein the graphical representation is related to the movement of the one or more anatomical structures and is reflective of one or more of a direction of the movement, degree of the movement, or whether the movement is an expanding or contracting movement.

22. The ultrasound system of claim 20, wherein the ultrasound image acquisition comprises a series of ultrasound image frames, and the at least one processor is further configured to:

compare a variance of the one or more landmark points in each ultrasound image frame of the series of ultrasound image frames to a variance in a first ultrasound image frame of the series of ultrasound image frames; and trigger an indication when the variance of the one or more landmark points meets a threshold variance relative to the first ultrasound image frame.

* * * * *